United States Patent
Karaki et al.

(10) Patent No.: US 12,452,880 B2
(45) Date of Patent: Oct. 21, 2025

(54) SCHEDULING MULTIPLE TRANSPORT BLOCKS EACH OVER MULTIPLE SLOTS USING SINGLE DOWNLINK CONTROL INFORMATION (DCI)

(71) Applicant: Telefonaktiebolaget LM Ericsson (publ), Stockholm (SE)

(72) Inventors: Reem Karaki, Aachen (DE); Jung-Fu Cheng, Fremont, CA (US); Yuhang Liu, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 378 days.

(21) Appl. No.: 17/925,699

(22) PCT Filed: May 21, 2021

(86) PCT No.: PCT/SE2021/050481
§ 371 (c)(1),
(2) Date: Nov. 16, 2022

(87) PCT Pub. No.: WO2021/236005
PCT Pub. Date: Nov. 25, 2021

(65) Prior Publication Data
US 2023/0189288 A1 Jun. 15, 2023

Related U.S. Application Data

(60) Provisional application No. 63/029,145, filed on May 22, 2020.

(51) Int. Cl.
*H04W 72/232* (2023.01)
*H04L 1/1812* (2023.01)
(Continued)

(52) U.S. Cl.
CPC ......... *H04W 72/232* (2023.01); *H04L 1/1812* (2013.01); *H04W 72/0446* (2013.01); *H04W 72/12* (2013.01)

(58) Field of Classification Search
CPC ........... H04W 72/232; H04W 72/0446; H04W 72/12; H04L 1/1812; H04L 1/1822; H04L 1/1864; H04L 1/1896; H04L 1/1887
See application file for complete search history.

(56) References Cited

U.S. PATENT DOCUMENTS

| | | | |
|---|---|---|---|
| 2022/0150936 A1* | 5/2022 | Lee | H04W 76/14 |
| 2022/0174667 A1* | 6/2022 | Lei | H04L 5/0094 |

OTHER PUBLICATIONS

International Search Report and Written Opinion dated Jul. 26, 2021 for International Application No. PCT/SE2021/050481 filed May 21, 2021, consisting of 8 pages.
(Continued)

*Primary Examiner* — Nizam U Ahmed
(74) *Attorney, Agent, or Firm* — Sage Patent Group

(57) ABSTRACT

A method, network node and wireless device (WD) for scheduling multiple transport blocks (TB) each over multiple slots using single downlink control information (DCI) are disclosed. According to one aspect, a network node is configured to communicate with a wireless device is provided. The network node includes processing circuitry configured to configure downlink control information, DCI, for scheduling at least one transport block, TB, where at least one of the at least one TB is configured to span more than one slot, and indicate the DCI to the wireless device.

20 Claims, 10 Drawing Sheets

(51) Int. Cl.
*H04W 72/0446* (2023.01)
*H04W 72/12* (2023.01)

(56) References Cited

OTHER PUBLICATIONS

3GPP TSG RAN WG1 Meeting #98 R1-1909694 Title: Feature lead summary#2 of HARQ enhancements for NR-U; Agenda item: 7.2.2.2.3; Source: Huawei; Document for: Discussion and Decision; Location and Date: Prague, Czech Republic, Aug. 26-30, 2019, consisting of 29 pages.
3GPP TS 38.214 V15.9.0; 3rd Generation Partnership Project; Technical Specification Group Radio Access Network; NR; Physical layer procedures for data (Release 15); Mar. 2020, consisting of 107 pages.

\* cited by examiner

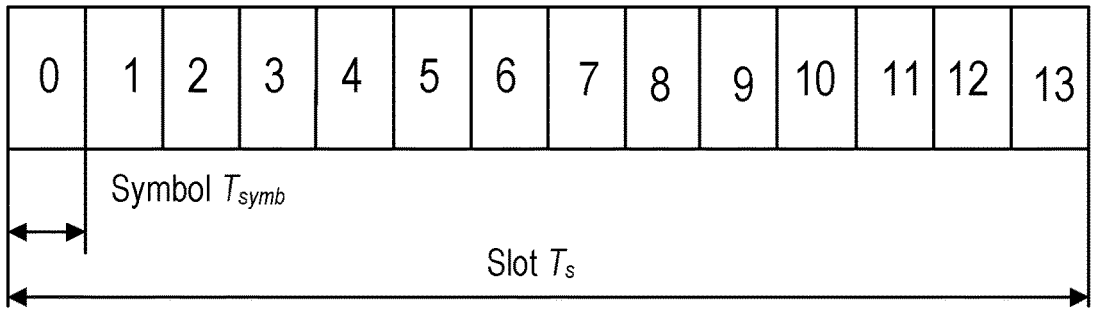
FIG. 2
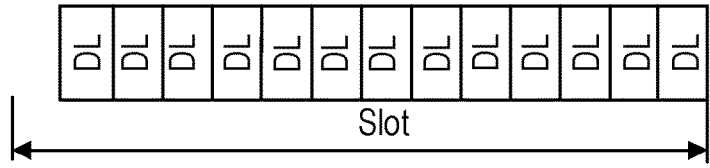
DL-only transmission with late start
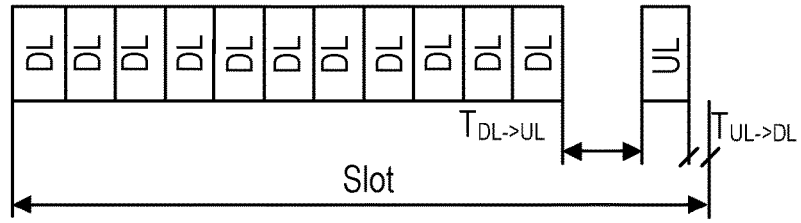
DL-heavy transmission with UL part
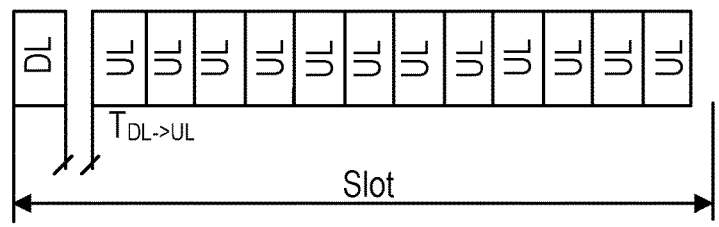
UL-heavy transmission with DL control
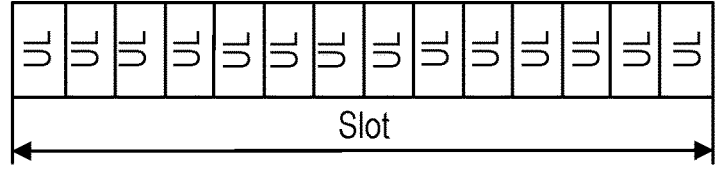
UL-only transmission
FIG. 3

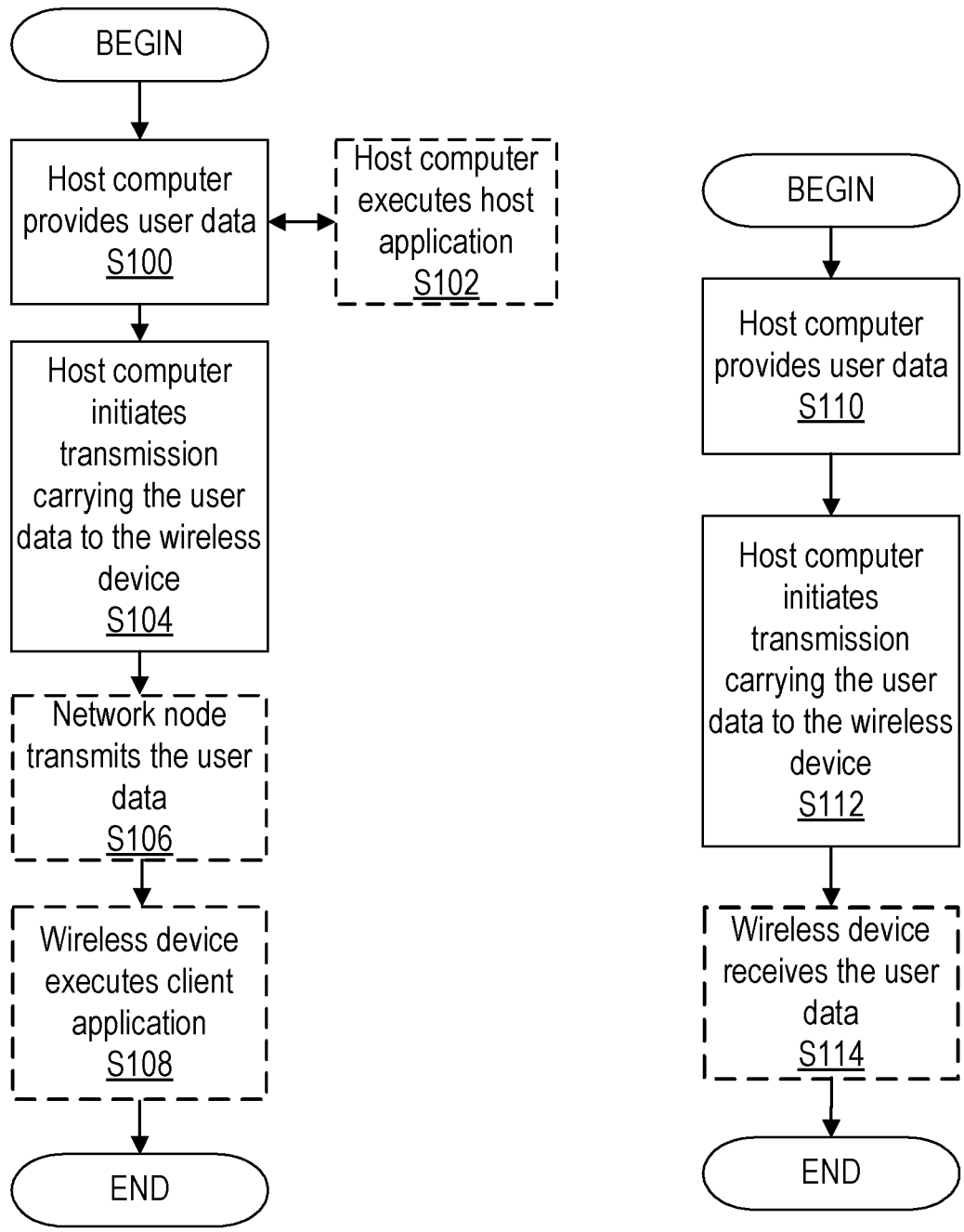

SCHEDULING MULTIPLE TRANSPORT BLOCKS EACH OVER MULTIPLE SLOTS USING SINGLE DOWNLINK CONTROL INFORMATION (DCI)

CROSS-REFERENCE TO RELATED APPLICATIONS

This application is a Submission Under 35 U.S.C. § 371 for U.S. National Stage Patent Application of International Application No.: PCT/SE2021/050481, filed May 21, 2021 entitled "SCHEDULING MULTIPLE TRANSPORT BLOCKS EACH OVER MULTIPLES SLOTS USING SINGLE DOWNLINK CONTROL INFORMATION (DCI)," which claims priority to U.S. Provisional Application No. 63/029,145, filed May 22, 2020, entitled "SCHEDULING MULTIPLE TRANSPORT BLOCKS EACH OVER MULTIPLE SLOTS USING SINGLE DCI," the entireties of both of which are incorporated herein by reference.

TECHNICAL FIELD

The present disclosure relates to wireless communications, and in particular, to scheduling multiple transport blocks (TB) each over multiple slots using single downlink control information (DCI).

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD).

Similar to LTE, NR uses OFDM (Orthogonal Frequency Division Multiplexing) in the downlink (i.e. from a network node, gNB, eNB, or base station, to a user equipment or WD). The basic NR physical resource over an antenna port can thus be seen as a time-frequency grid as illustrated in FIG. 1, where a resource block (RB) in a 14-symbol slot is shown. A resource block corresponds to 12 contiguous subcarriers in the frequency domain. Resource blocks are numbered in the frequency domain, starting with 0 from one end of the system bandwidth. Each resource element corresponds to one OFDM subcarrier during one OFDM symbol interval.

Multiple OFDM numerologies are supported in NR, for example as given by Table 1, where the subcarrier spacing, $\Delta f$, and the cyclic prefix for a carrier bandwidth part are configured by different higher layer parameters for downlink and uplink, respectively.

TABLE 1

| | Subcarrier spacing $\Delta f = 2^\mu \cdot 15[kHz]$ | | | | |
|---|---|---|---|---|---|
| | 15 kHz | 30 kHz | 60 kHz | 120 kHz | 240 kHz |
| Slot duration | 1000 µs | 500 µs | 250 µs | 125 µs | 62.5 µs |
| OFDM symbol, duration | 66.67 µs | 33.33 µs | 16.67 µs | 8.33 µs | 4.17 µs |
| Cyclic prefix, duration | 4.69 µs | 2.34 µs | 1.17 µs | 0.59 µs | 0.29 µs |
| OFDM symbol including cyclic prefix | 71.35 µs | 35.68 µs | 17.84 µs | 8.92 µs | 4.46 µs |
| Max carrier bandwidth (assuming 4k FFT) | 50 MHz | 100 MHz | 200 MHz | 400 MHz | 800 MHz |

Slot Structure for NR

In the time domain, downlink and uplink transmissions in NR will be organized into equally-sized subframes of 1 ms each similar to LTE. A subframe is further divided into multiple slots of equal duration. The slot length for subcarrier spacing $\Delta f=(15\times 2^\mu)$ kHz is $\frac{1}{2}^\mu$ ms. There is only one slot per subframe for $\Delta f=15$ kHz and a slot consists of 14 OFDM symbols.

An NR slot has 14 OFDM symbols. In FIG. 2, $T_s$ and $T_{symb}$ denote the slot and OFDM symbol duration, respectively.

In addition, the symbols within a slot may be classified as either uplink (UL), downlink (DL) or Flexible to accommodate DL/UL transient periods and both DL and UL transmissions. Potential example variations are shown in FIG. 3.

Furthermore, NR also defines mini-slots (referred to as Type B physical downlink shared channel/physical uplink shared channel (PDSCH/PUSCH) mapping in 3GPP specifications). Mini-slots are shorter than slots and can start at any symbol. Mini-slots are used if the transmission duration of a slot is too long or the occurrence of the next slot start (slot alignment) is too late. Applications of mini-slots include latency critical transmissions (in this case both mini-slot length and frequent opportunity of mini-slot may be important) and unlicensed spectrum where a transmission should start immediately after listen-before-talk succeeded (here the frequent opportunity of mini-slot may be especially important). An example of mini-slots is shown in FIG. 4

Time Resource Allocations for PUSCH

When the WD is scheduled to transmit a transport block, the Time domain resource assignment field value m of the DCI provides a row index m+1 to an allocated RRC configured table. The indexed row defines:

- the slot offset $K_2$;
- the start and length indicator SLIV, or directly the start symbol S and the allocation length L; and
- the PUSCH mapping type to be applied in the PUSCH transmission.

The slot where the WD may transmit the PUSCH is determined by K2 as $$\left\lfloor n \cdot \frac{2^{\mu_{PUSCH}}}{2^{\mu_{PDCCH}}} \right\rfloor + K_2$$

where n is the slot with the scheduling DCI, K2 is based on the numerology of PUSCH, and $\mu_{PUSCH}$ and $\mu_{PDCCH}$ are the subcarrier spacing configurations for PUSCH and the physical downlink control channel (PDCCH), respectively The starting symbol S relative to the start of the slot, and the number of consecutive symbols L counting from the symbol S allocated for the PUSCH are determined from the start and length indicator SLIV of the indexed row:
if (L−1)≤7 then

SLIV=14·(L−1)+S else

SLIV=14·(14−L+1)+(14−1−S)

where 0<L≤14−S
The WD considers the S and L combinations defined in Table 2 as valid PUSCH allocations.

TABLE 2

| PUSCH mapping type | Normal cyclic prefix | | | Extended cyclic prefix | | |
|---|---|---|---|---|---|---|
| | S | L | S + L | S | L | S + L |
| Type A | 0 | {4, . . . , 14} | {4, . . . , 14} | 0 | {4, . . . , 12} | {4, . . . , 12} |
| Type B | {0, . . . , 13} | {1, . . . , 14} | {1, . . . , 14} | {0, . . . , 12} | {1, . . . , 12} | {1, . . . , 12} |

Either a default PUSCH time domain allocation A according to Table 3, is applied, or the higher layer configured pusch-AllocationList in either pusch-ConfigCommon or pusch-Config is applied, where j depends on the subcarrier spacing and is defined in Table 4.

TABLE 3

| Row index | PUSCH mapping type | $K_2$ | S | L |
|---|---|---|---|---|
| 1 | Type A | j | 0 | 8 |
| 2 | Type A | j | 0 | 12 |
| 3 | Type A | j | 0 | 10 |
| 4 | Type B | j | 2 | 10 |
| 5 | Type B | j | 4 | 4 |
| 6 | Type B | j | 4 | 8 |
| 7 | Type B | j | 4 | 6 |
| 8 | Type A | j + 1 | 0 | 8 |
| 9 | Type A | j + 1 | 0 | 12 |
| 10 | Type A | j + 1 | 0 | 10 |
| 11 | Type A | j + 2 | 0 | 6 |
| 12 | Type A | j + 2 | 0 | 12 |

TABLE 3-continued

| Row index | PUSCH mapping type | $K_2$ | S | L |
|---|---|---|---|---|
| 13 | Type A | j + 2 | 0 | 10 |
| 14 | Type B | j | 8 | 4 |
| 15 | Type A | j + 3 | 0 | 8 |
| 16 | Type A | j + 3 | 0 | 10 |

TABLE 4

| $\mu_{PUSCH}$ | j |
|---|---|
| 0 | 1 |
| 1 | 1 |
| 2 | 2 |
| 3 | 3 |

According to 3GPP Technical Release 15 (Rel-15), the pusch-AllocationList can be higher layer configured as follows:

```
-- ASN1START
-- TAG-PUSCH-TIMEDOMAINRESOURCEALLOCATIONLIST-START
PUSCH-TimeDomainResourceAllocationList ::= SEQUENCE
(SIZE(1..maxNrofUL-Allocations)) OF PUSCH-
TimeDomainResourceAllocation
PUSCH-TimeDomainResourceAllocation ::= SEQUENCE {
   k2                    INTEGER(0..32)     OPTIONAL,   -- NeedS
   mappingType           ENUMERATED {typeA, typeB},
   startSymbolAndLength  INTEGER (0..127)
}
-- TAG-PUSCH-TIMEDOMAINRESOURCEALLOCATIONLIST-STOP
—ANSI STIOP
``` where the fields are defined as follows:
- k2 Corresponds to L1 parameter 'K2' (see, for example, 3GPP Technical Specification (TS) 38.214, clause 6.1.2.1) When the field is absent the WD applies the value 1 when PUSCH SCS is 15/30 kHz; the value 2 when PUSCH SCS is 60 kHz, and the value 3 when PUSCH SCS is 120 KHz.
- mappingType Mapping type (see, for example, 3GPP TS 38.214, clause 6.1.2.1).
- startSymbolAndLength An index giving valid combinations of start symbol and length (jointly encoded) as start and length indicator (SLIV). The network configures the field so that the allocation does not cross the slot boundary. (see, for example, 3GPP TS 38.214, clause 6.1.2.1).

Transport Block Preparation

In the 3GPP NR system specifications, the data transported by the PDSCH or the PUSCH is organized as a transport block (TB). In order to detect whether the transport block is correctly received at the receiver, a cyclic redundancy check (CRC) checksum is appended to the transport block. The total length of the transport block and the CRC checksum needs to be one of the channel codeword lengths (CWL). When the transport block size is small enough to be handled as a single low density parity check (LDPC) codeword, the transport block CRC checksum size is set to 16. This CRC attachment procedure for small transport blocks is illustrated in FIG. 5. Hence, when the transport block size is no greater than 3824, the transport block size is selected from a table included in the 3GPP NR specifications.

In modern high data rate communications systems, large amounts of data bits in the transport block can be transmitted by one PDSCH or PUSCH at a time. Since it is impractical to implement channel codecs of very large block lengths, it is necessary to divide a large transport block into multiple smaller units referred to as code blocks (CB), whose sizes can be handled by the channel codec hardware. When a transport block is segmented into several code blocks, additional CRC checksums for the individual code blocks are further added to enable early stopping of the channel decoder and code block group based operations. This two-level CRC attachment procedure is illustrated in FIG. 6. The CRC checksums for the transport block and the code block can, in general, be of different sizes or computed based on different CRC check equations.

Note that the code block segmentation procedure takes as its input the transport block bits and the associated transport block CRC checksum bits. Hence, the last code block contains the transport block CRC checksum bits as illustrated in FIG. 6.

In 3GPP NR,
If the transport block size is no greater than 3824, no code block segmentation is performed and the transport block CRC checksum size is set to 16;
If the transport block size is greater than 3824, the transport block CRC checksum size is set to 24. Furthermore:
- If the code rate is no greater than ¼, code block segmentation is performed using LDPC codeword lengths up to 3840 bits;
- Otherwise:
  - If the transport block size is no greater than 8424, no code block segmentation is performed.
  - If the transport block size is greater than 8424, code block segmentation is performed using LDPC codeword lengths up to 8448 bits.

The code block CRC checksum length is always 24 bits in NR.

Scheduling Approaches

According to 3GPP Technical Release 16 (Rel-16), the duration of PUSCH/PDSCH transmission does not exceed 14 symbols. An initial transmission of a transport block (TB) is confined within a single PUSCH/PDSCH.

The current 3GPP NR specification supports different ways to schedule multiple PUSCHs using single DCI, either:
- Mode1: Type A repetition: in cases where the indicated number of repetition (K)>1, the same symbol allocation (SLIV) is applied across the K consecutive slots. K2 indicates the slot where the WD shall transmit the first PUSCH of the multiple PUSCHs. Each PUSCH carries a full TB, and correspond to random variable (RV) value depending on the configured RV sequence;
- Mode2: Type B repetition: the time domain resource allocation (TDRA) indicates number of contiguous PUSCH repetitions, K2 indicates the slot where the WD shall transmit the first PUSCH of the multiple PUSCHs. S indicates the starting symbol of the first PUSCH, and L is the length of the PUSCH repetitions. Each PUSCH carries a full TB, and correspond to RV value depending on the configured RV sequence; and
- Mode3: Multiple PUSCH scheduling: the time domain resource allocation (TDRA) indicates allocations for two to eight contiguous PUSCHs, K2 indicates the slot where the WD shall transmit the first PUSCH of the multiple PUSCHs. Each PUSCH has a separate SLIV and mapping type, and carries different TB. The number of scheduled PUSCHs is signaled by the number of indicated valid SLIVs in the row of the pusch-TimeDomainAllocationList signaled in DCI format 0_1.

CBG Based Retransmission

In addition to transport block based re-transmissions, NR also supports Code Block Group (CBG) based re-transmissions to selectively re-transmit parts of the transport block. The CBGs may be constructed as follows:
- The maximum number N of CBG(s) per TB is configured by RRC signaling;
- The number M of CBG(s) in the TB equals to min(C, N), where C is the number of CB(s) within the TB;
- For CBG construction;
  - The first Mod(C,M) CBG(s) out of total M CBG(s) include ceil(C/M) CB(s) per CBG;
  - The remaining M-Mod(C,M) CBG(s) include floor(C/M) CB(s) per CBG; and
- For initial transmission and retransmission, each CBG of a TB has the same set of CB(s).

N=2, 4, 6, or 8 for 1 CW and N=1, 2, 3, or 4 for 2 CWs. A CBGTI field can be configured to be present in the DCI to indicate what CBG(s) to retransmit.

Channel Coding and Rate Matching for Code Blocks in NR

After code block segmentation, the individual coded blocks are channel encoded and rate matched separately. In the 3GPP NR specification, the total number of coded bits available for transmission of the transport block is denoted by G. The coded bits available for transmission are divided as evenly as possible among the code blocks scheduled for transmission.

The preparation, channel encoding and rate matching for a large transport block transmission over a scheduled slot in NR is summarized in FIG. 7. After a transport block CRC attachment, code block segmentation is performed to produce several code blocks of equal size. After code block CRC attachment, the code blocks are channel encoded and rate matched to as equal number of coded bits as possible.

The processing delays in terms of symbols as shown in Table 5 become larger for higher subcarrier spacing (SCS), even though the absolute time might be smaller.

TABLE 5

| PDSCH Configuration | HARQ Timing | 15 kHz SCS | 20 kHz SCS | 60 kHz SCS | 120 kHz SCS |
|---|---|---|---|---|---|
| Front loaded DMRS only | N1 | 8 | 10 | 17 | 20 |
| Front loaded plus additional DMRS | N1 | 13 | 13 | 20 | 24 |
| Frequency first RE mapping | N2 | 10 | 12 | 23 | 36 | where N1 is the number of Orthogonal Frequency Division Multiplexed (OFDM) symbols from an end of the physical downlink shared channel (PDSCH) until the beginning of the physical uplink control channel (PUSCH), N2 is the number of OFDM symbols from an end of the physical downlink shared channel (PDCCH) (uplink grant) until the beginning of the physical uplink control channel (PUSCH) and HARQ is hybrid automatic repeat request.

The processing delays have an impact on the scheduling behavior. NR operates with limited HARQ processes. The initial transmission of a TB is confined within single PUSCH/PDSCH that may not exceed 14 symbols. New data cannot be scheduled unless there is a free HARQ process to be used for the TB transmission or unacknowledged data has to be discarded.

For higher frequency band using higher SCS (960 kHz or more), a constraint on hardware implementation may be made to either (1) increase the number of HARQ processes to avoid situations where the transmissions need to be stalled due to lack of free HARQ processes and long delays for processing or (2) reducing the processing time even further.

Known solutions do not allow scheduling of multiple of TBs using single DCI.

SUMMARY

Some embodiments advantageously provide methods, network nodes and wireless devices for scheduling multiple transport blocks (TB) each over multiple slots using single downlink control information (DCI). Some embodiments provide a scheduling solution that addresses a long processing delay, especially for high SCS.

According to one aspect, a network node is configured to communicate with a wireless device (WD). The network node includes a radio interface and/or comprising processing circuitry configured to schedule the WD using a physical shared channel (PXSCH) over a plurality of time slots, the scheduling being transmitted to the WD on a downlink control information (DCI) transmission, and map each of a plurality of transport blocks (TB) to a separate hybrid automatic repeat request (HARQ), a HARQ feedback from the WD being scheduled based at least in part on the DCI.

According to this aspect, in some embodiments, the processing circuitry is further configured to group PXSCH transmissions into a number of HARQ processes and to indicate a number of PXSCH per TB for each TB. In some embodiments, a number of HARQ processes is indicated by a field in the DCI. In some embodiments, each slot of the plurality of time slots has a portion of coded bits of a same TB. In some embodiments, each of the plurality of TBs are carried over one or more PXSCHs.

According to another aspect, a method implemented in network node. The method includes scheduling the WD using a physical shared channel (PXSCH), over a plurality of time slots, the scheduling being transmitted to the WD on a downlink control information (DCI) transmission, and mapping each of a plurality of transport blocks (TB) to a separate hybrid automatic repeat request (HARQ), a HARQ feedback from the WD being scheduled based at least in part on the DCI.

According to this aspect, in some embodiments, the method further includes grouping the PXSCH transmissions into a number of HARQ processes and indicating a number of PXSCH per TB for each TB. In some embodiments, a number of HARQ processes is indicated by a field in the DCI. In some embodiments, each slot of the plurality of time slots has a portion of coded bits of a same TB. In some embodiments, each of the plurality of TBs are carried over one or more PXSCHs.

According to yet another aspect, a wireless device (WD) is configured to communicate with a network node. The WD includes a radio interface and/or processing circuitry configured to receive downlink control information, (DCI) indicating scheduling physical shared channel (PXSCH) transmissions over a plurality of time slots, and schedule HARQ feedback to be transmitted on a PXSCH according to the indication from the DCI.

According to another aspect, a method implemented in a wireless device (WD), includes receiving downlink control information, (DCI) indicating scheduling physical shared channel (PXSCH) transmissions over a plurality of time slots and scheduling HARQ feedback to be transmitted on a PXSCH over the plurality of time slots according to the indication from the DCI.

According to one aspect of the disclosure, a network node is configured to communicate with a wireless device. The network node includes processing circuitry configured to: configure downlink control information, DCI, for scheduling at least one transport block, TB, at least one of the at least one TB configured to span more than one slot; and indicate the DCI to the wireless device.

According to one or more embodiments of this aspect, the DCI is configured to indicate a plurality of start and length indicator values, SLIVs, each SLIV value corresponding to a physical shared channel transmission. According to one or more embodiments of this aspect, each physical shared channel transmission is configured to map to a respective hybrid automatic repeat request, HARQ, process and respective TB of the at least one TB. According to one or more embodiments of this aspect, the physical shared channel transmissions associated with the plurality of SLIVs are configured to be transmitted in one of contiguous and noncontiguous slots.

According to one or more embodiments of this aspect, the DCI is configured to indicate a quantity of HARQ processes associated with the at least one TB. According to one or more embodiments of this aspect, the quantity of HARQ processes are indicated in a different DCI field than a DCI field used to indicate a row index in a configured table. According to one or more embodiments of this aspect, the DCI indicates the plurality of SLIVs and quantity of HARQ processes at least in part by indicating a row index in a configured table.

According to one or more embodiments of this aspect, the configured table explicitly indicates a quantity of physical shared channel transmissions associated each HARQ process of the quantity of HARQ processes. According to one or more embodiments of this aspect, the processing circuitry is further configured to indicate the configured table to the wireless device. According to one or more embodiments of this aspect, a quantity of the plurality of SLIVs and the quantity of HARQ processes explicitly indicates a quantity of physical shared channel transmissions per TB.

According to one or more embodiments of this aspect, the indicated quantity of HARQ processes further indicates a quantity of TBs. According to one or more embodiments of this aspect, the DCI is further configured to indicate a slot offset for physical shared channel scheduling.

According to another aspect of the disclosure, a wireless device configured to communicate with a network node is provided. The wireless device includes processing circuitry configured to: receive downlink control information, DCI, for scheduling at least one transport block, TB, and determine at least one of the at least one TB is configured to span more than one slot.

According to one or more embodiments of this aspect, the DCI is configured to indicate a plurality of start and length indicator values, SLIVs, each SLIV value corresponding to a physical shared channel transmission. According to one or more embodiments of this aspect, each physical shared channel transmission is configured to map to a respective hybrid automatic repeat request, HARQ, process and respective TB of the at least one TB. According to one or more embodiments of this aspect, the physical shared channel transmissions associated with the plurality of SLIVs are configured to be transmitted in one of contiguous and noncontiguous slots.

According to one or more embodiments of this aspect, the DCI is configured to indicate a quantity of HARQ processes associated with the at least one TB. According to one or more embodiments of this aspect, the quantity of HARQ processes are indicated in a different DCI field than a DCI field used to indicate a row index in a configured table. According to one or more embodiments of this aspect, the DCI indicates the plurality of SLIVs and quantity of HARQ processes at least in part by indicating a row index in a configured table.

According to one or more embodiments of this aspect, the configured table explicitly indicates a quantity of physical shared channel transmissions associated each HARQ process of the quantity of HARQ processes. According to one or more embodiments of this aspect, the processing circuitry is further configured to receive the configured table. According to one or more embodiments of this aspect, a quantity of the plurality of SLIVs and the quantity of HARQ processes explicitly indicates a quantity of physical shared channel transmissions per TB.

According to one or more embodiments of this aspect, the indicated quantity of HARQ processes further indicates a quantity of TBs. According to one or more embodiments of this aspect, the DCI is further configured to indicate a slot offset for physical shared channel scheduling.

A method implemented by a network node that is configured to communicate with a wireless device is provided. Downlink control information, DCI, for scheduling at least one transport block, TB, is configured where at least one of the at least one TB configured to span more than one slot. The DCI is indicated to the wireless device.

According to one or more embodiments of this aspect, the DCI is configured to indicate a plurality of start and length indicator values, SLIVs, where each SLIV value corresponds to a physical shared channel transmission. According to one or more embodiments of this aspect, each physical shared channel transmission is configured to map to a respective hybrid automatic repeat request, HARQ, process and respective TB of the at least one TB. According to one or more embodiments of this aspect, the physical shared channel transmissions associated with the plurality of SLIVs are configured to be transmitted in one of contiguous and noncontiguous slots.

According to one or more embodiments of this aspect, the DCI is configured to indicate a quantity of HARQ processes associated with the at least one TB. According to one or more embodiments of this aspect, the quantity of HARQ processes are indicated in a different DCI field than a DCI field used to indicate a row index in a configured table. According to one or more embodiments of this aspect, the DCI indicates the plurality of SLIVs and quantity of HARQ processes at least in part by indicating a row index in a configured table. According to one or more embodiments of this aspect, the configured table explicitly indicates a quantity of physical shared channel transmissions associated each HARQ process of the quantity of HARQ processes.

According to one or more embodiments of this aspect, the configured table is indicated to the wireless device. According to one or more embodiments of this aspect, a quantity of the plurality of SLIVs and the quantity of HARQ processes explicitly indicates a quantity of physical shared channel transmissions per TB. According to one or more embodiments of this aspect, the indicated quantity of HARQ processes further indicates a quantity of TBs. According to one or more embodiments of this aspect, the DCI is further configured to indicate a slot offset for physical shared channel scheduling.

According to another aspect of the disclosure, a method implemented by a wireless device that is configured to communicate with a network node is provided. Downlink control information, DCI, for scheduling at least one transport block, TB, is received. A determination is performed that at least one of the at least one TB is configured to span more than one slot.

According to one or more embodiments of this aspect, the DCI is configured to indicate a plurality of start and length indicator values, SLIVs, each SLIV value corresponding to a physical shared channel transmission. According to one or more embodiments of this aspect, each physical shared channel transmission is configured to map to a respective hybrid automatic repeat request, HARQ, process and respective TB of the at least one TB. According to one or more embodiments of this aspect, the physical shared channel transmissions associated with the plurality of SLIVs are configured to be transmitted in one of contiguous and noncontiguous slots.

According to one or more embodiments of this aspect, the DCI is configured to indicate a quantity of HARQ processes associated with the at least one TB. According to one or more embodiments of this aspect, the quantity of HARQ processes are indicated in a different DCI field than a DCI field used to indicate a row index in a configured table. According to one or more embodiments of this aspect, the DCI indicates the plurality of SLIVs and quantity of HARQ processes at least in part by indicating a row index in a configured table.

According to one or more embodiments of this aspect, the configured table explicitly indicates a quantity of physical shared channel transmissions associated each HARQ process of the quantity of HARQ processes. According to one or more embodiments of this aspect, the configured table is received. According to one or more embodiments of this aspect, a quantity of the plurality of SLIVs and the quantity of HARQ processes explicitly indicates a quantity of physical shared channel transmissions per TB.

According to one or more embodiments of this aspect, the indicated quantity of HARQ processes further indicates a quantity of TBs. According to one or more embodiments of this aspect, the DCI is further configured to indicate a slot offset for physical shared channel scheduling.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 2 illustrates a slot denoting an OFDM symbol;

FIG. 3 illustrates potential variations of downlink and uplink slots;

FIG. 10 is a flowchart illustrating example methods implemented in a communication system including a host computer, a network node and a wireless device for executing a client application at a wireless device according to some embodiments of the present disclosure;

FIG. 11 is a flowchart illustrating example methods implemented in a communication system including a host computer, a network node and a wireless device for receiving user data at a wireless device according to some embodiments of the present disclosure;

DETAILED DESCRIPTION

Figure 1:
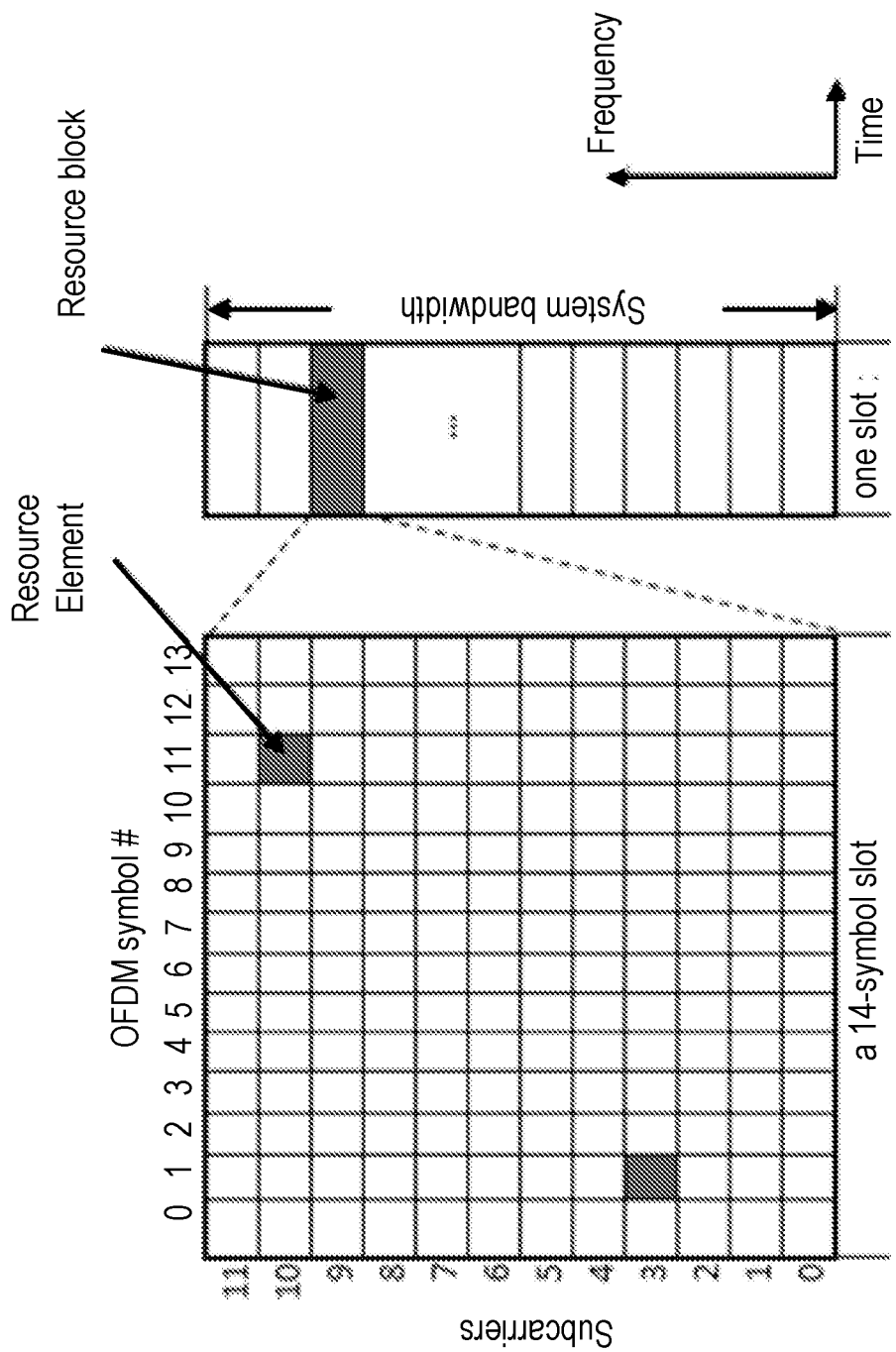
FIG. 1 is a time-frequency diagram of radio resources.
Figure 4:
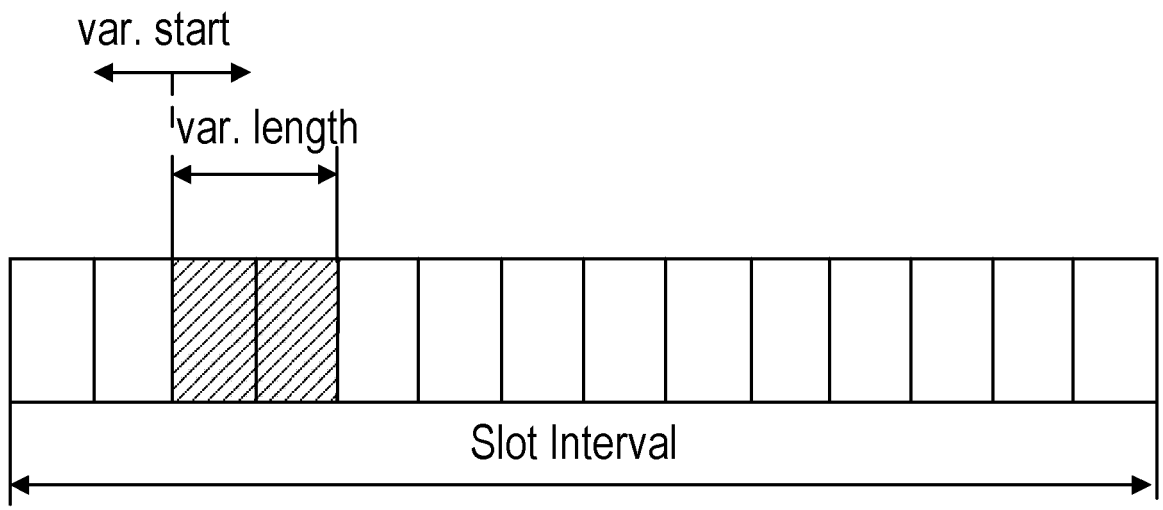
FIG. 4 is an example of mini-slots.
Figure 5:
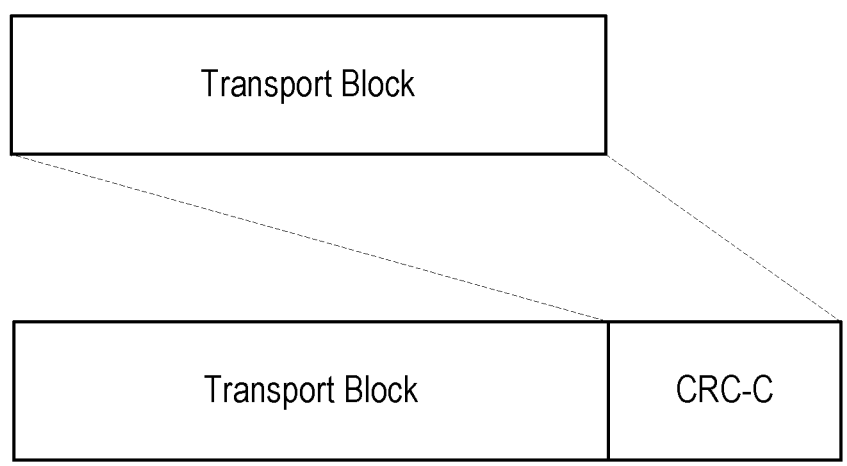
FIG. 5 illustrates a CRC attachment procedure.
Figure 6:
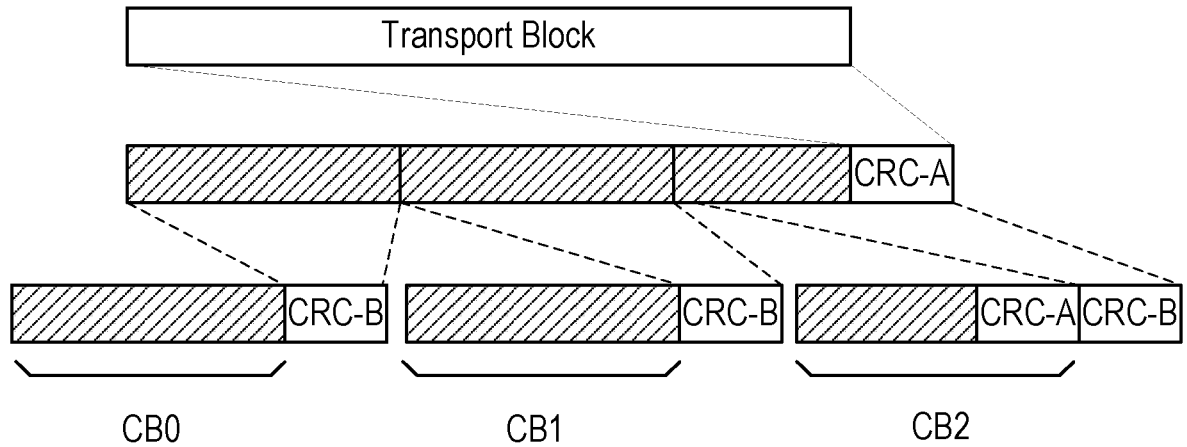
FIG. 6 illustrates a two-level CRC attachment procedure.
Figure 7:
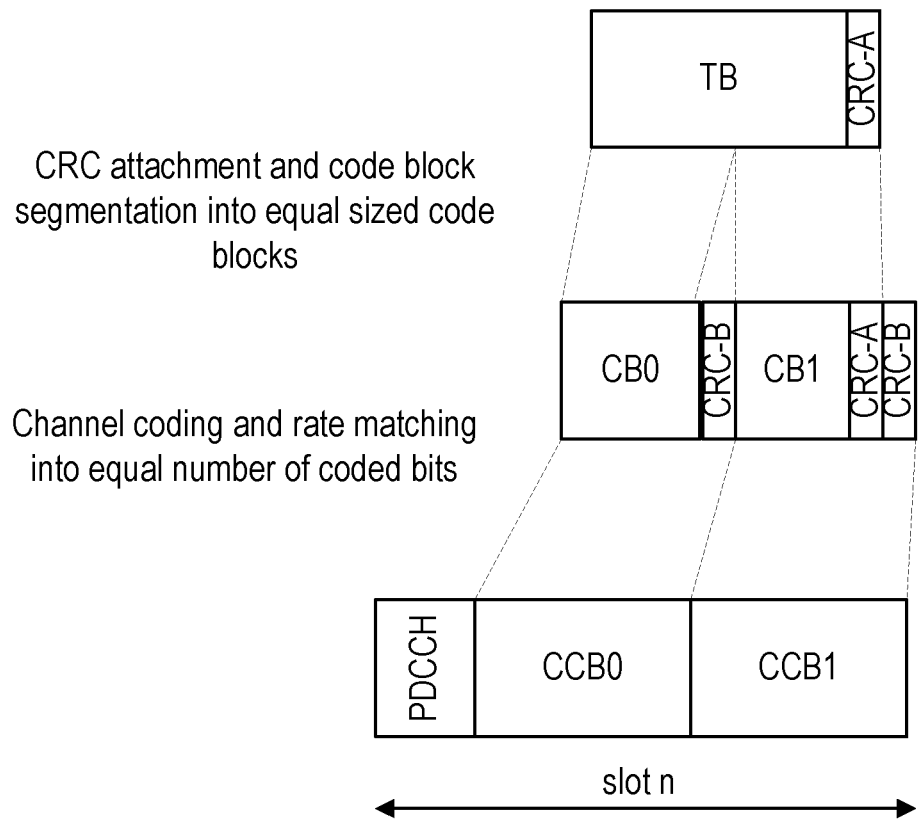
FIG. 7 illustrates channel encoding and rate matching for large transport blocks.

Before describing in detail example embodiments, it is noted that the embodiments reside primarily in combinations of apparatus components and processing steps related to scheduling multiple transport blocks (TB) each over multiple slots using single downlink control information (DCI). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide for scheduling multiple transport blocks (TB) each over multiple slots using single downlink control information (DCI). In some embodiments, a transport block (TB) can be transmitted over multiple PXSCHs, where PXSCH means the physical uplink shared channel or the physical downlink shared channel, where each PXSCH can be up to 14 symbols within a slot. Each PXSCH carries part of the coded bits of the same transport block.

Using a single downlink control information (DCI) transmission, the WD can be scheduled on one or more TBs where each of the TBs is carried over one or more PXSCH. According to one aspect, a method includes scheduling the WD using a physical shared channel (PXSCH) over a plurality of time slots, the scheduling being transmitted to the WD on a downlink control information (DCI) transmission. The method further includes mapping each of a plurality of transport blocks (TB) to a separate hybrid automatic repeat request (HARQ), a HARQ feedback from the WD being scheduled based on the DCI.

Figure 8:
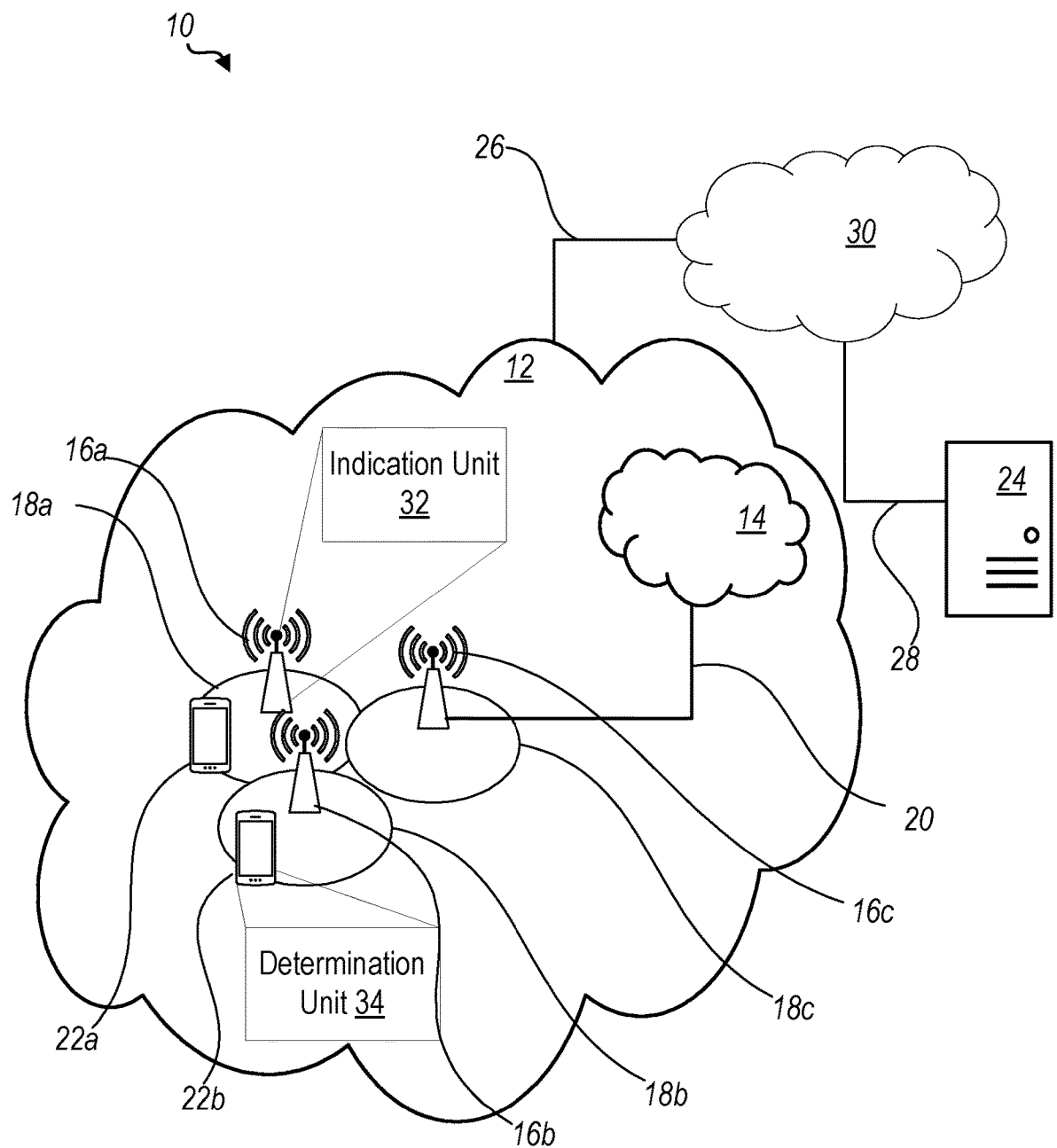
FIG. 8 is a schematic diagram of an example network architecture illustrating a communication system connected via an intermediate network to a host computer according to the principles in the present disclosure.

Returning now to the drawing figures, in which like elements are referred to by like reference numerals, there is shown in FIG. 8 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 8 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over)

to a connected WD 22a. Similarly, the network node 16 need not be aware of the future routing of an outgoing uplink communication originating from the WD 22a towards the host computer 24.

A network node 16 is configured to include an indication unit 32 which is configured to schedule the WD using a physical shared channel (PXSCH) over a plurality of time slots, the scheduling being transmitted to the WD on a downlink control information (DCI) transmission. A wireless device 22 is configured to include a determination unit 34 which is configured to schedule HARQ feedback to be transmitted on a PXSCH according to the indication from the DCI.

Example implementations, in accordance with an embodiment, of the WD 22, network node 16 and host computer 24 discussed in the preceding paragraphs will now be described with reference to FIG. 9. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include indication unit 32 which is configured to schedule the WD using a physical shared channel (PXSCH) over a plurality of time slots, the scheduling being transmitted to the WD on a downlink control information (DCI) transmission.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include determination unit 34 which is configured to schedule HARQ feedback to be transmitted on a PXSCH according to the indication from the DCI.

Figure 9:
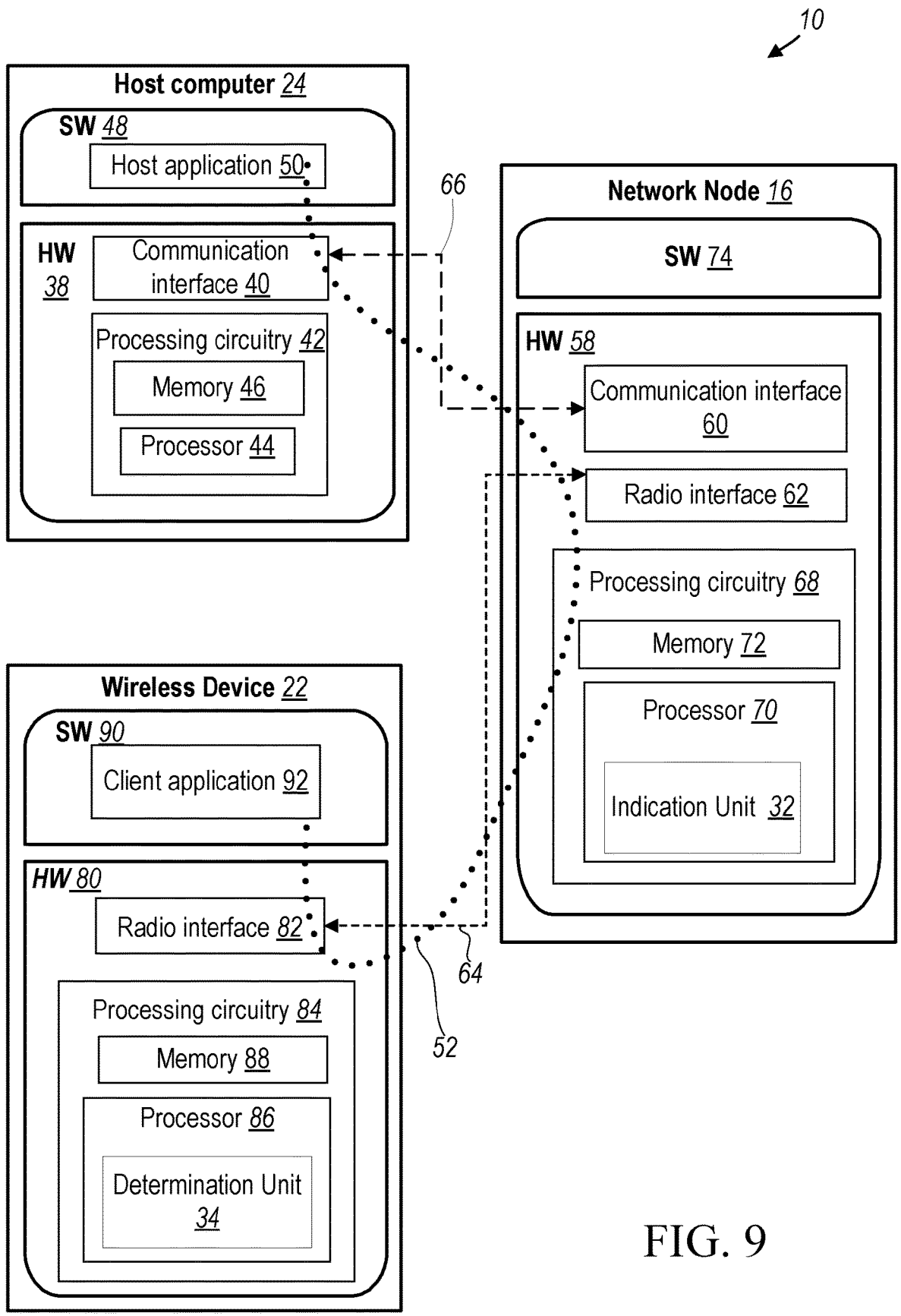
FIG. 9 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 9 and independently, the surrounding network topology may be that of FIG. 8.

In FIG. 9, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 8 and 9 show various "units" such as indication unit 32, and determination unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 10 is a flowchart illustrating an example method implemented in a communication system, such as, for example, the communication system of FIGS. 8 and 9, in accordance with one embodiment. The communication system may include a host computer 24, a network node 16 and a WD 22, which may be those described with reference to FIG. 9. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 11 is a flowchart illustrating an example method implemented in a communication system, such as, for example, the communication system of FIG. 8, in accordance with one embodiment. The communication system may include a host computer 24, a network node 16 and a WD 22, which may be those described with reference to FIGS. 8 and 9. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 12, 13:
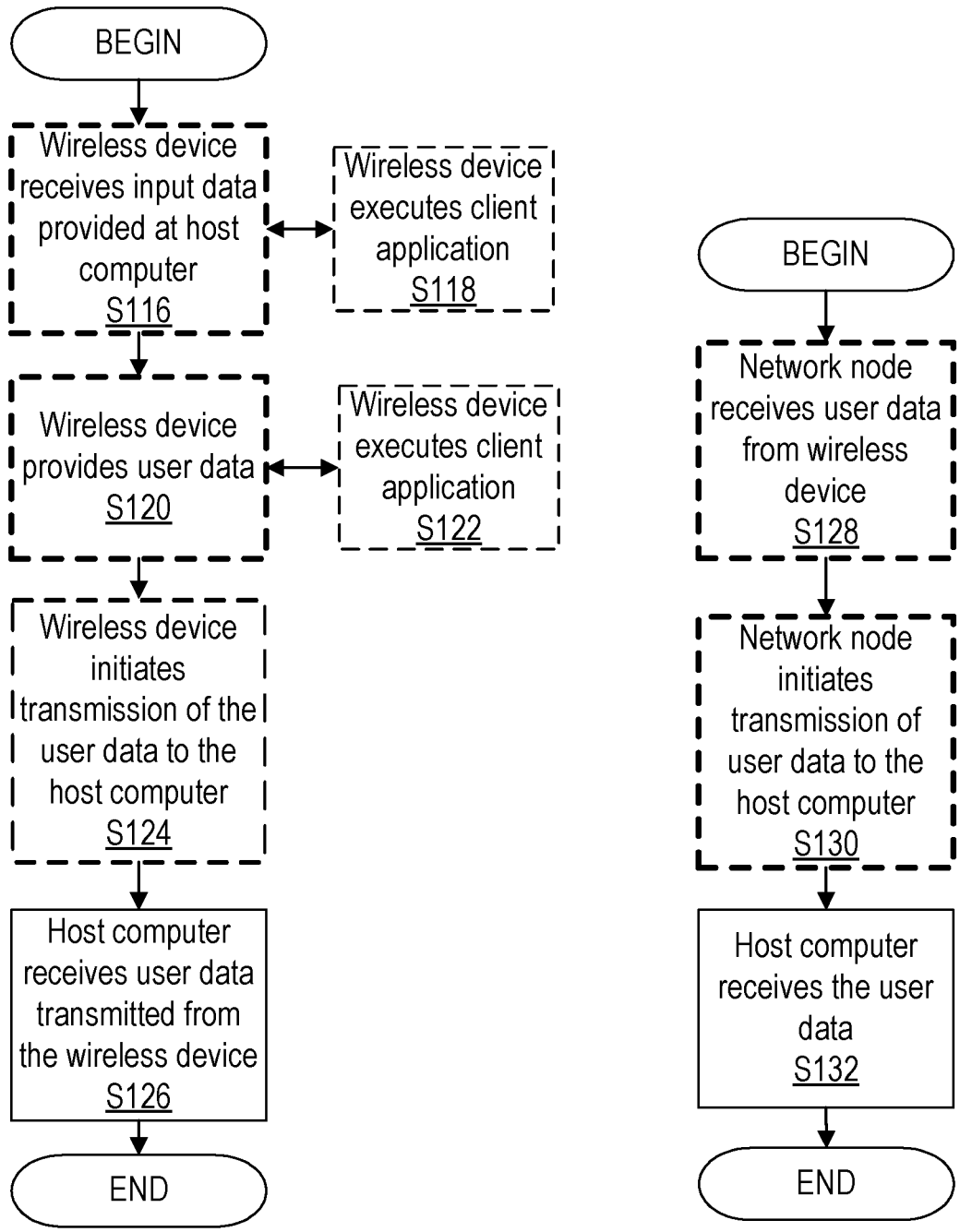
FIG. 12 is a flowchart illustrating example methods implemented in a communication system including a host computer, a network node and a wireless device for receiving user data from the wireless device at a host computer according to some embodiments of the present disclosure.
FIG. 13 is a flowchart illustrating example methods implemented in a communication system including a host computer, a network node and a wireless device for receiving user data at a host computer according to some embodiments of the present disclosure.

FIG. 12 is a flowchart illustrating an example method implemented in a communication system, such as, for example, the communication system of FIG. 8, in accordance with one embodiment. The communication system may include a host computer 24, a network node 16 and a WD 22, which may be those described with reference to FIGS. 8 and 9. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 13 is a flowchart illustrating an example method implemented in a communication system, such as, for example, the communication system of FIG. 8, in accordance with one embodiment. The communication system may include a host computer 24, a network node 16 and a WD 22, which may be those described with reference to FIGS. 8 and 9. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 14:
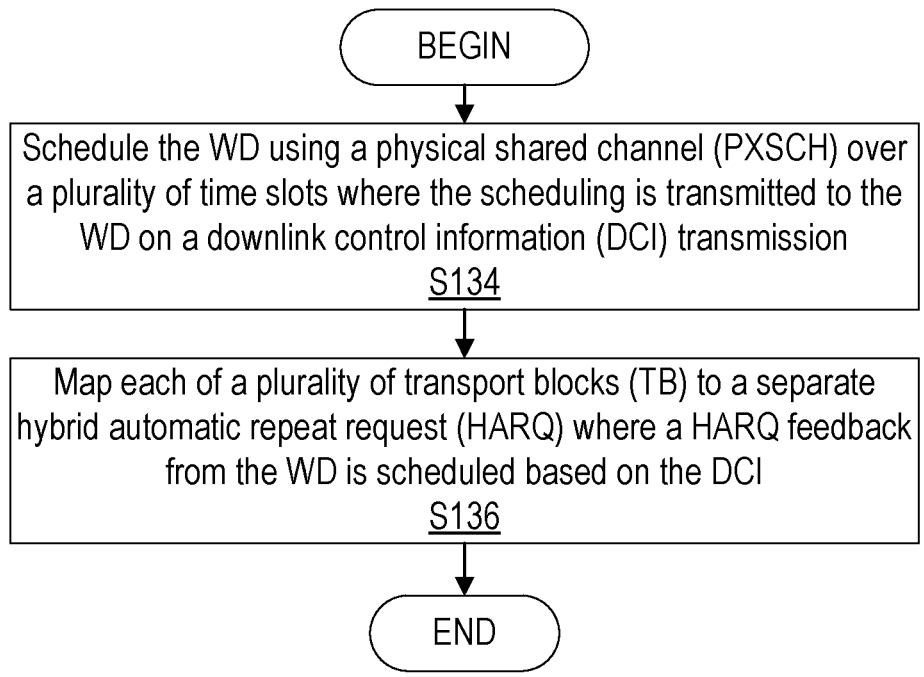
FIG. 14 is a flowchart of an example process in a network node for scheduling multiple transport blocks (TB) each over multiple slots using single downlink control information (DCI) according to some embodiments of the present disclosure.

FIG. 14 is a flowchart of an example process in a network node 16 for scheduling multiple transport blocks (TB) each over multiple slots using single downlink control information (DCI). One or more blocks described herein may be performed by one or more elements of network node 16 such as by one or more of processing circuitry 68 (including the indication unit 32), processor 70, radio interface 62 and/or communication interface 60. Network node 16 such as via processing circuitry 68 and/or processor 70 and/or radio interface 62 and/or communication interface 60 is configured to schedule the WD using a physical shared channel (PXSCH) over a plurality of time slots, the scheduling being transmitted to the WD on a downlink control information (DCI) transmission (Block S134). The process also includes mapping each of a plurality of transport blocks (TB) to a separate hybrid automatic repeat request (HARQ), a HARQ feedback from the WD being scheduled based on the DCI (Block S136).

Figure 15:
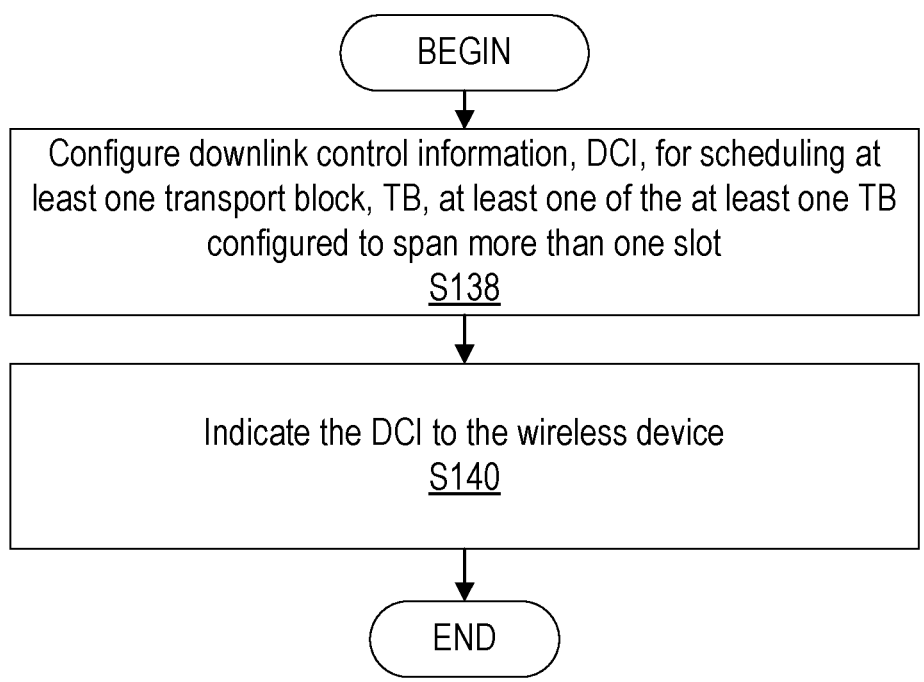
FIG. 15 is a flowchart of another example process in a network node according to some embodiments of the present disclosure.

FIG. 15 is a flowchart of another example process in a network node 16 according to some embodiments of the present disclosure. One or more blocks described herein may be performed by one or more elements of network node 16 such as by one or more of processing circuitry 68 (including the indication unit 32), processor 70, radio interface 62 and/or communication interface 60. Network node 16 is configured to configure (Block S138) downlink control information, DCI, for scheduling at least one transport block (TB) where at least one of the at least one TB is configured to span more than one slot, as described herein. Network node 16 is configured to indicate (Block S140) the DCI to the wireless device 22, as described herein.

According to one or more embodiments of this aspect, the DCI is configured to indicate a plurality of start and length indicator values (SLIVs) where each SLIV value corresponds to a physical shared channel transmission, as described herein. According to one or more embodiments of this aspect, each physical shared channel transmission is configured to map to a respective hybrid automatic repeat request, HARQ, process and respective TB of the at least one TB. According to one or more embodiments of this aspect, the physical shared channel transmissions associated with the plurality of SLIVs are configured to be transmitted in one of contiguous and noncontiguous slots.

According to one or more embodiments of this aspect, the DCI is configured to indicate a quantity of HARQ processes associated with the at least one TB. According to one or more embodiments of this aspect, the quantity of HARQ processes are indicated in a different DCI field than a DCI field used to indicate a row index in a configured table. According to one or more embodiments of this aspect, the DCI indicates the plurality of SLIVs and quantity of HARQ processes at least in part by indicating a row index in a configured table.

According to one or more embodiments of this aspect, the configured table explicitly indicates a quantity of physical shared channel transmissions associated each HARQ process of the quantity of HARQ processes. According to one or more embodiments of this aspect, the processing circuitry 68 is further configured to indicate the configured table to the wireless device 22. According to one or more embodiments of this aspect, a quantity of the plurality of SLIVs and the quantity of HARQ processes explicitly indicates a quantity of physical shared channel transmissions per TB. According to one or more embodiments of this aspect, the indicated quantity of HARQ processes further indicates a quantity of TBs. According to one or more embodiments, the DCI is further configured to indicate a slot offset for physical shared channel scheduling.

Figure 16:
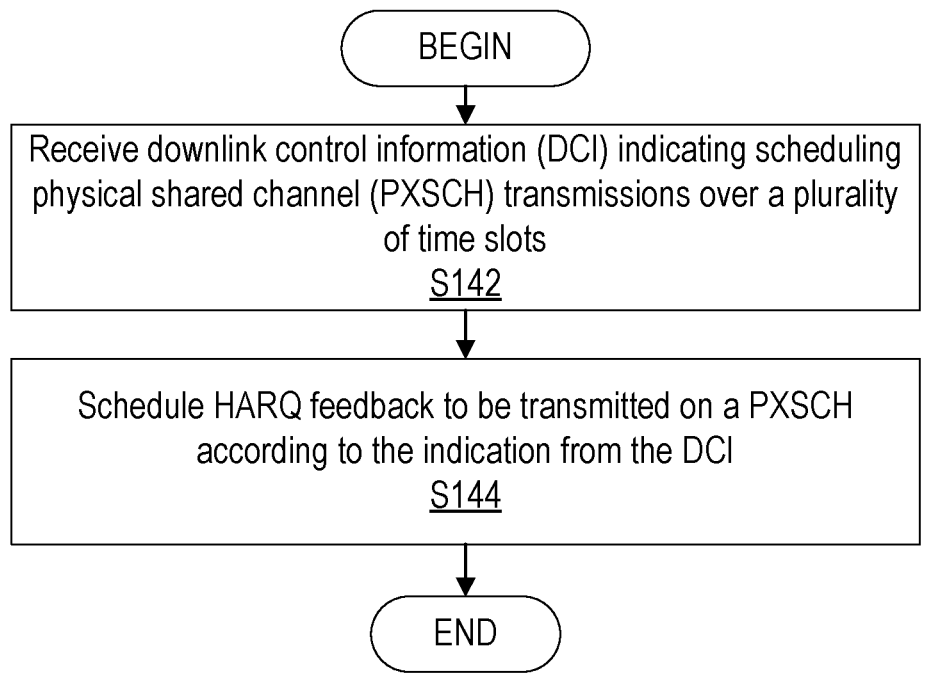
FIG. 16 is a flowchart of an example process in a wireless device for scheduling multiple transport blocks (TB) each over multiple slots using single downlink control information (DCI)

FIG. 16 is a flowchart of an example process in a wireless device 22 according to some embodiments of the present disclosure. One or more blocks described herein may be performed by one or more elements of wireless device 22 such as by one or more of processing circuitry 84 (including the determination unit 34), processor 86, radio interface 82 and/or communication interface 60. Wireless device 22 such as via processing circuitry 84 and/or processor 86 and/or radio interface 82 is configured to receive downlink control information, (DCI) indicating scheduling physical shared channel (PXSCH) transmissions over a plurality of time slots (Block S142). The process also includes scheduling HARQ feedback to be transmitted on a PXSCH according to the indication from the DCI (Block S144).

Figure 17:
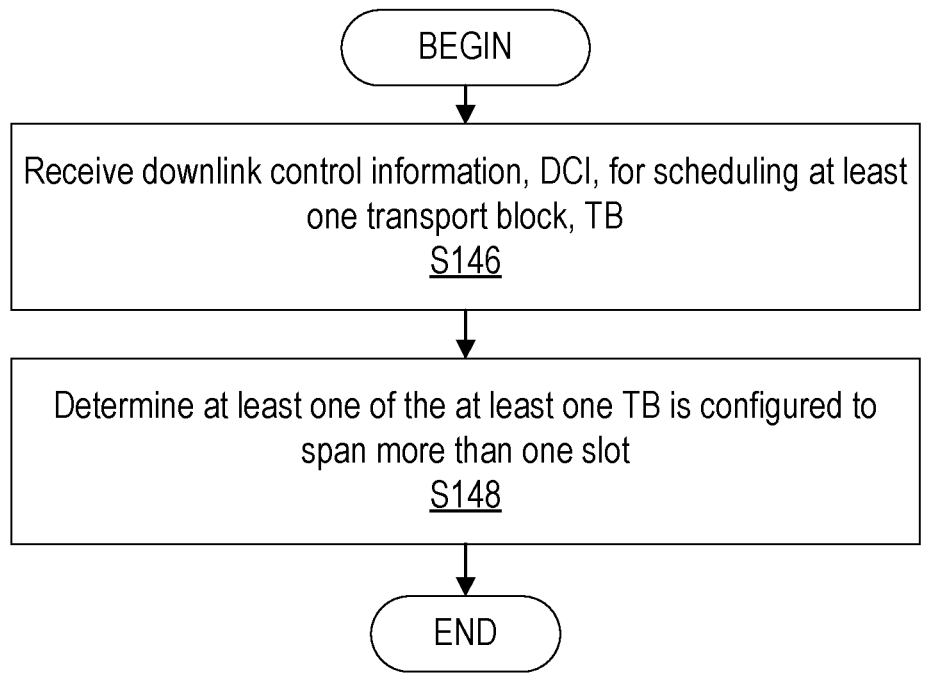
FIG. 17 is a flowchart of another example process in a wireless device according to some embodiments of the present disclosure.

FIG. 17 is a flowchart of an example process in a wireless device 22 according to some embodiments of the present disclosure. One or more blocks described herein may be performed by one or more elements of wireless device 22 such as by one or more of processing circuitry 84 (including the determination unit 34), processor 86, radio interface 82 and/or communication interface 60. Wireless device 22 is configured to receive (Block S146) downlink control information, DCI, for scheduling at least one transport block (TB) as described herein. Wireless device 22 is configured to determine (Block S148) at least one of the at least one TB is configured to span more than one slot, as described herein.

According to one or more embodiments, the DCI is configured to indicate a plurality of start and length indicator values (SLIVs) where each SLIV value corresponds to a physical shared channel transmission, as described herein. According to one or more embodiments, each physical shared channel transmission is configured to map to a respective hybrid automatic repeat request (HARQ) process and respective TB of the at least one TB, as described herein. According to one or more embodiments, the physical shared channel transmissions associated with the plurality of SLIVs are configured to be transmitted in one of contiguous and noncontiguous slots, as described herein.

According to one or more embodiments, the DCI is configured to indicate a quantity of HARQ processes associated with the at least one TB, as described herein. According to one or more embodiments, the quantity of HARQ processes are indicated in a different DCI field than a DCI field used to indicate a row index in a configured table, as described herein. According to one or more embodiments, the DCI indicates the plurality of SLIVs and quantity of HARQ processes at least in part by indicating a row index in a configured table, as described herein.

According to one or more embodiments, the configured table explicitly indicates a quantity of physical shared channel transmissions associated each HARQ process of the quantity of HARQ processes, as described herein. According to one or more embodiments, the processing circuitry 84 is further configured to receive the configured table, as described herein. According to one or more embodiments, a quantity of the plurality of SLIVs and the quantity of HARQ processes explicitly indicates a quantity of physical shared channel transmissions per TB, as described herein.

According to one or more embodiments, the indicated quantity of HARQ processes further indicates a quantity of TBs, as described herein. According to one or more embodiments, the DCI is further configured to indicate a slot offset for physical shared channel scheduling, as described herein.

Having described the general process flow of arrangements of the disclosure and having provided examples of hardware and software arrangements for implementing the processes and functions of the disclosure, the sections below provide details and examples of arrangements for scheduling multiple transport blocks (TB) each over multiple slots using single downlink control information (DCI).

One or more network node 16 functions described below may be performed by one or more of processing circuitry 68, processor 70, indication unit 32, radio interface 62, etc. One or more wireless device 22 functions described below may be performed by one or more of processing circuitry 84, processor 86, determination unit 34, radio interface 82, etc.

Embodiment 1

When the WD 22 is scheduled using a multi-PXSCH scheduling DCI, the Time domain resource assignment field value m of the DCI provides a row index m+1 to an allocated radio resource control (RRC) configured table. The indexed row may contain at least:
the slot offset (i.e., $K_1$ for PDSCH scheduling and K2 for PUSCH scheduling);
the start symbol and length of each of the scheduled PXSCH, represented by a valid SLIV value;
Number of HARQ processes: indicates the number of HARQ processes to be assigned for the scheduled PXSCHs. As a non-limiting example, it can be:
1 HARQ process spanning the full allocation;
1 HARQ process per PXSCH (one SLIV); or
1 HARQ process per one or more PXSCH.
In any of the embodiments, a "number of HARQ processes" can be replaced with a "number of TBs" field. It should be understood, that regardless of the naming of the field, a single TB is mapped to a single HARQ process. "TB" and "HARQ process" is used interchangeably in this disclosure.

Depending on the number of scheduled PXSCH and number of HARQ processes, the WD 22 derives the number of PXSCH per transport block.

The grouping of PXSCH into the number of HARQ processes is according to the following procedure:
M is the number of scheduled PXSCH (i.e. PXSCH with valid SLIV value) and C is the indicated number of HARQ processes;
The first Mod(M, C) TB out of total C TB(s) include ceil(M C) PXSCH per TB; and
The remaining M-Mod(M,C) TB(s) include floor(M C) PXSCH per TB.

Table 6 shows an example combination of {list of SLIVs, # of HARQ processes} that can be indicated as part of the time resource assignment under the assumption that the network node 16 can schedule up to 8 PUSCHs using a single DCI, and the number of scheduled PUSCHs is derived from the number of indicated SLIV values. In other words, 3 PUSCHs are scheduled by the first 3 rows, and 4 PUSCHs according to the last row.

TABLE 6

| Indicated SLIV(s) | | | | | | | | Indicated # HARQ process. | Grouping of PUSCH into TB(s) |
| --- | --- | --- | --- | --- | --- | --- | --- | --- | --- |
| 1 | 2 | 3 | 4 | 5 | 6 | 7 | 8 | | |
| {0, 14} | {0, 14} | {0, 14} | | | | | | 1 | One TB scheduled over 3 PUSCHs |
| {0, 14} | {0, 14} | {0, 14} | | | | | | 3 | Three TBs are scheduled. Each PUSCH carries a TB. |
| {0, 14} | {0, 14} | {0, 14} | | | | | | 2 | 2 TBs are scheduled. First TB is carried over the first two scheduled PUSCHs. |
| {0, 14} | {0, 14} | {0, 14} | {0, 14} | | | | | 2 | 2 TBs are scheduled, each TB is carried over 2 PUSCHs |

Embodiment 2

This embodiment is the same as Embodiment 1 except that the grouping of PXSCH into the # of HARQ processes is indicated by the network node 16, i.e., the number of PXSCH per TB is indicated by the network node 16 for every TB.

Table 7 shows an example, where the number of HARQ processes indicates a list of number of PXSCH per HARQ. The total number of HARQ processes corresponds to the number of entries in the indicated list.

Embodiment 3

In a further embodiment, the time domain resource assignment does not contain the number of HARQ processes. Instead, the number of HARQ processes is indicated via L1 signaling, e.g., by a new field in the DCI.

Table 8 shows an example of a condensed time domain resource assignment table. By not carrying the "number of HARQ processes" in individual rows, the size of the time domain resource assignment table can be reduced, or additional combinations of time domain resource assignment table can be utilized. In a scheduling DCI, the row index to the time domain resource assignment table and the number of HARQ processes are signaled in separate fields. The WD 22 can use this information to determine the grouping of PXSCH into the number of HARQ processes according to the above teaching.

TABLE 7

| SLIV | | | | | | | | # HARQ process. | Behavior |
| --- | --- | --- | --- | --- | --- | --- | --- | --- | --- |
| 1 | 2 | 3 | 4 | 5 | 6 | 7 | 8 | | |
| {0, 14} | {0, 14} | {0, 14} | | | | | | {3} | One TB scheduled over 3 PUSCHs |
| {0, 14} | {0, 14} | {0, 14} | | | | | | {1, 1, 1} | Three TBs are scheduled. Each PUSCH carries a TB. |
| {0, 14} | {0, 14} | {0, 14} | | | | | | {1, 2} | 2 TBs are scheduled. First TB is carried over the first scheduled PUSCH. Second TB is carried over the last two scheduled PUSCH. |
| {0, 14} | {0, 14} | {0, 14} | {0, 14} | | | | | {2, 2} | 2 TBs are scheduled, each TB is carried over 2 PUSCHs |

TABLE 8

| SLIV | | | | | | | |
|---|---|---|---|---|---|---|---|
| 1 | 2 | 3 | 4 | 5 | 6 | 7 | 8 |
| {0, 14} | {0, 14} | {0, 14} | | | | | |
| {0, 14} | {0, 14} | {0, 14} | {0, 14} | | | | |

Note, in embodiments 1, 2 and 3, a PXSCH is confined to a slot. Hence, for these embodiments, a multitude of "scheduled PXSCH" can be replaced with a multitude of "scheduled slots."

Embodiment 4

In some embodiments, a TB is always mapped to one PXSCH, which can be transmitted in one or multiple slots. Each PXSCH slot carries part of the coded bits of the same transport block.

Using a single DCI, the WD 22 can be scheduled one or more TBs where each of the TBs is carried over one or more PXSCH slots.

When the WD 22 is scheduled using a multi-PXSCH scheduling DCI, the time domain resource assignment field value m of the DCI provides a row index m+1 to an allocated RRC configured table. The indexed row contains at least:
 the slot offset K2;
 the start symbol and length of each of the scheduled PXSCH, represented by a valid SLIV value.

To support PXSCH transmission over one or multiple slots, the length of the PXSCH in number of OFDM symbols can be larger than 14. In some embodiments, the length of the PXSCH in number of OFDM symbols can be larger than 14 but not more than 14*N, where N is the maximum number of slots for a PXSCH allocation.

Table 9 shows four example lists of SLIVs that can be indicated as part of the time resource assignment under the assumption here is that the network node 16 can schedule up to 8 PUSCHs using a single DCI, and the number of scheduled TB can be derived from the number of indicated SLIV values.

TABLE 9

| Indicated SLIV(s) | | | | | | | | Grouping of PUSCH into TB(s) |
|---|---|---|---|---|---|---|---|---|
| 1 | 2 | 3 | 4 | 5 | 6 | 7 | 8 | |
| {0, 42} | | | | | | | | One TB scheduled over 3 slots |
| {0, 14} | {0, 14} | {0, 14} | | | | | | Three TBs are scheduled. Each slot carries a TB. |
| {0, 28} | {0, 14} | | | | | | | 2 TBs are scheduled. First TB is carried over the first two scheduled slots. Second TB is carried in the third slot. |
| {0, 28} | {0, 28} | | | | | | | 2 TBs are scheduled, each TB is carried over 2 slots. |

According to one aspect, a network node 16 is configured to communicate with a wireless device (WD). The network node 16 includes a radio interface 62 and/or comprising processing circuitry 68 configured to schedule the WD 22 using a physical shared channel (PXSCH) over a plurality of time slots, the scheduling being transmitted to the WD 22 on a downlink control information (DCI) transmission, and map each of a plurality of transport blocks (TB) to a separate hybrid automatic repeat request (HARQ), a HARQ feedback from the WD 22 being scheduled based at least in part on the DCI.

According to this aspect, in some embodiments, the processing circuitry 68 is further configured to group PXSCH transmissions into a number of HARQ processes and to indicate a number of PXSCH per TB for each TB. In some embodiments, a number of HARQ processes is indicated by a field in the DCI. In some embodiments, each slot of the plurality of time slots has a portion of coded bits of a same TB. In some embodiments, each of the plurality of TBs are carried over one or more PXSCHs.

According to another aspect, a method implemented in network node 16. The method includes scheduling the WD 22 using a physical shared channel (PXSCH), over a plurality of time slots, the scheduling being transmitted to the WD 22 on a downlink control information (DCI) transmission, and mapping each of a plurality of transport blocks (TB) to a separate hybrid automatic repeat request (HARQ), a HARQ feedback from the WD 22 being scheduled based at least in part on the DCI.

According to this aspect, in some embodiments, the method further includes grouping the PXSCH transmissions into a number of HARQ processes and indicating a number of PXSCH per TB for each TB. In some embodiments, a number of HARQ processes is indicated by a field in the DCI. In some embodiments, each slot of the plurality of time slots has a portion of coded bits of a same TB. In some embodiments, each of the plurality of TBs are carried over one or more PXSCHs.

According to yet another aspect, a wireless device (WD) 22 is configured to communicate with a network node 16. The WD 22 includes a radio interface 82 and/or processing circuitry 84 configured to receive downlink control information, (DCI) indicating scheduling physical shared channel (PXSCH) transmissions over a plurality of time slots, and schedule HARQ feedback to be transmitted on a PXSCH according to the indication from the DCI.

According to another aspect, a method implemented in a wireless device (WD) 22, includes receiving downlink control information, (DCI) indicating scheduling physical shared channel (PXSCH) transmissions over a plurality of time slots and scheduling HARQ feedback to be transmitted on a PXSCH over the plurality of time slots according to the indication from the DCI.

EXAMPLES

Example A1. A network node 16 configured to communicate with a wireless device 22 (WD 22), the network node 16 configured to, and/or comprising a radio interface 62 and/or comprising processing circuitry 68 configured to:

schedule the WD 22 using a physical shared channel (PXSCH) over a plurality of time slots, the scheduling being transmitted to the WD 22 on a downlink control information (DCI) transmission; and map each of a plurality of transport blocks (TB) to a separate hybrid automatic repeat request (HARQ), a HARQ feedback from the WD 22 being scheduled based at least in part on the DCI.

Example A2. The network node 16 of Example A1, wherein the processing circuitry 68 is further configured to group PXSCH transmissions into a number of HARQ processes and to indicate a number of PXSCH per TB for each TB.

Example A3. The network node 16 of Example A1, wherein a number of HARQ processes is indicated by a field in the DCI.

Example A4. The network node 16 of Example A1, wherein each slot of the plurality of time slots has a portion of coded bits of a same TB.

Example A5. The network node 16 of Example A1, wherein each of the plurality of TBs are carried over one or more PXSCHs.

Example B1. A method implemented in network node 16, the method comprising:

scheduling the WD 22 using a physical shared channel (PXSCH), over a plurality of time slots, the scheduling being transmitted to the WD on a downlink control information (DCI) transmission; and mapping each of a plurality of transport blocks (TB) to a separate hybrid automatic repeat request (HARQ), a HARQ feedback from the WD 22 being scheduled based at least in part on the DCI.

Example B2. The method of Example B1, further comprising grouping the PXSCH transmissions into a number of HARQ processes and indicating a number of PXSCH per TB for each TB.

Example B3. The method of Example B1, wherein a number of HARQ processes is indicated by a field in the DCI.

Example B4. The method of Example B1, wherein each slot of the plurality of time slots has a portion of coded bits of a same TB.

Example B5. The method of Example B1, wherein each of the plurality of TBs are carried over one or more PXSCHs.

Example C1. A wireless device 22 (WD 22) configured to communicate with a network node 16, the WD 22 configured to, and/or comprising a radio interface 62 and/or processing circuitry 68 configured to:

receive downlink control information, (DCI) indicating scheduling physical shared channel (PXSCH) transmissions over a plurality of time slots; and schedule HARQ feedback to be transmitted on a PXSCH according to the indication from the DCI.

Example D1. A method implemented in a wireless device 22 (WD 22), the method comprising:

receiving downlink control information, (DCI) indicating scheduling physical shared channel (PXSCH) transmissions over a plurality of time slots; and scheduling HARQ feedback to be transmitted on a PXSCH over the plurality of time slots according to the indication from the DCI.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device, the network node comprising:
    processing circuitry configured to:
        configure downlink control information (DCI) for scheduling at least one transport block (TB) at least one of the at least one TB configured to span more than one slot; and
        indicate the DCI to the wireless device, wherein each slot of the plurality of time slots has a portion of coded bits of same TB.

2. The network node of claim 1, wherein the DCI is configured to indicate a plurality of start and length indicator values (SLIVs), each SLIV value corresponding to a physical shared channel transmission.

3. The network node of claim 2, wherein each physical shared channel transmission is configured to map to a respective hybrid automatic repeat request (HARQ) process and respective TB of the at least one TB.

4. The network node of claim 3, wherein the physical shared channel transmissions associated with the plurality of SLIVs are configured to be transmitted in one of contiguous and noncontiguous slots.

5. The network node of claim 2, wherein the DCI is configured to indicate a quantity of HARQ processes associated with the at least one TB.

6. The network node of claim 5, wherein the quantity of HARQ processes are indicated in a different DCI field than a DCI field used to indicate a row index in a configured table.

7. The network node of claim 6, wherein the processing circuitry is further configured to indicate the configured table to the wireless device.

8. The network node of claim 5, wherein the DCI indicates the plurality of SLIVs and quantity of HARQ processes at least in part by indicating a row index in a configured table.

9. The network node of claim 8, wherein the configured table explicitly indicates a quantity of physical shared channel transmissions associated each HARQ process of the quantity of HARQ processes.

10. The network node of claim 5, wherein a quantity of the plurality of SLIVs and the quantity of HARQ processes explicitly indicates a quantity of physical shared channel transmissions per TB.

11. The network node of claim 5, wherein the indicated quantity of HARQ processes further indicates a quantity of TBs.

12. The network node of claim 1, wherein the DCI is further configured to indicate a slot offset for physical shared channel scheduling.

13. A wireless device configured to communicate with a network node, the wireless device comprising:
    processing circuitry configured to:
        receive downlink control information (DCI) for scheduling at least one transport block (TB); and
        determine at least one of the at least one TB is configured to span more than one slot, wherein each slot of the plurality of time slots has a portion of coded bits of a same TB.

14. The wireless device of claim 13, wherein the DCI is configured to indicate a plurality of start and length indicator values (SLIVs), each SLIV value corresponding to a physical shared channel transmission.

15. The wireless device of claim 14, wherein each physical shared channel transmission is configured to map to a respective hybrid automatic repeat request (HARQ) process and respective TB of the at least one TB.

16. The wireless device of claim 15, wherein the physical shared channel transmissions associated with the plurality of SLIVs are configured to be transmitted in one of contiguous and noncontiguous slots.

17. The wireless device of claim 15, wherein the DCI is configured to indicate a quantity of HARQ processes associated with the at least one TB.

18. The wireless device of claim 17, wherein the quantity of HARQ processes are indicated in a different DCI field than a DCI field used to indicate a row index in a configured table.

19. The wireless device of claim 17, wherein the DCI indicates the plurality of SLIVs and quantity of HARQ processes at least in part by indicating a row index in a configured table.

20. The wireless device of claim 19, wherein the configured table explicitly indicates a quantity of physical shared channel transmissions associated each HARQ process of the quantity of HARQ processes.

* * * * *